United States Patent
Petit et al.

(10) Patent No.: US 6,790,415 B2
(45) Date of Patent: Sep. 14, 2004

(54) PROCESS AND REACTOR FOR TREATING A GAS BY MEANS OF A REGENERABLE ACTIVE PACKING

(75) Inventors: Pierre Petit, Chatenay Malabry (FR); Maurice Bosquain, Sommecaise (FR); Jean-Yves Lehman, Maisons Alfort (FR); Jean-Pierre Tranier, L'Hay-les-Roses (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 627 days.

(21) Appl. No.: 09/809,101

(22) Filed: Mar. 16, 2001

(65) Prior Publication Data
US 2001/0022955 A1 Sep. 20, 2001

(30) Foreign Application Priority Data
Mar. 16, 2000 (FR) .......................................... 00 03388

(51) Int. Cl.$^7$ .............................. B01J 10/00; B01J 8/04
(52) U.S. Cl. ....................................... 422/192; 422/218
(58) Field of Search ................................ 422/192, 190, 422/211, 218; 55/476

(56) References Cited

U.S. PATENT DOCUMENTS

| | | | | |
|---|---|---|---|---|
| 4,541,851 A | * | 9/1985 | Bosquain et al. | 96/126 |
| 5,137,548 A | * | 8/1992 | Grenier et al. | 95/41 |
| 5,283,050 A | * | 2/1994 | Gray | 422/211 |
| 5,505,050 A | * | 4/1996 | Arriulou et al. | 62/644 |
| 5,520,721 A | * | 5/1996 | Fraysse et al. | 95/114 |
| 5,549,733 A | * | 8/1996 | Marot et al. | 95/100 |
| 5,759,242 A | * | 6/1998 | Smolarek et al. | 96/149 |
| 5,772,737 A | * | 6/1998 | Andreani et al. | 95/98 |
| 5,819,820 A | * | 10/1998 | Lehman | 141/100 |
| 5,908,492 A | * | 6/1999 | Lehman et al. | 96/126 |
| 5,961,694 A | * | 10/1999 | Monereau et al. | 95/98 |
| 6,051,052 A | * | 4/2000 | Monereau et al. | 95/97 |
| 6,071,328 A | * | 6/2000 | Petit et al. | 95/98 |

FOREIGN PATENT DOCUMENTS

| | | |
|---|---|---|
| EP | 0 539 834 | 5/1993 |
| EP | 0 898 998 | 3/1999 |

* cited by examiner

Primary Examiner—M. Alexandra Elve
(74) Attorney, Agent, or Firm—Young & Thompson

(57) ABSTRACT

In this process, during at least one phase of the treatment cycle, the gas outflow is increased or decreased locally in at least one marginal region of the packing. Application to drying/$CO_2$ removal of atmospheric air intended to be distilled, or to the separation of gaseous mixtures by pressure modulated adsorption.

37 Claims, 8 Drawing Sheets

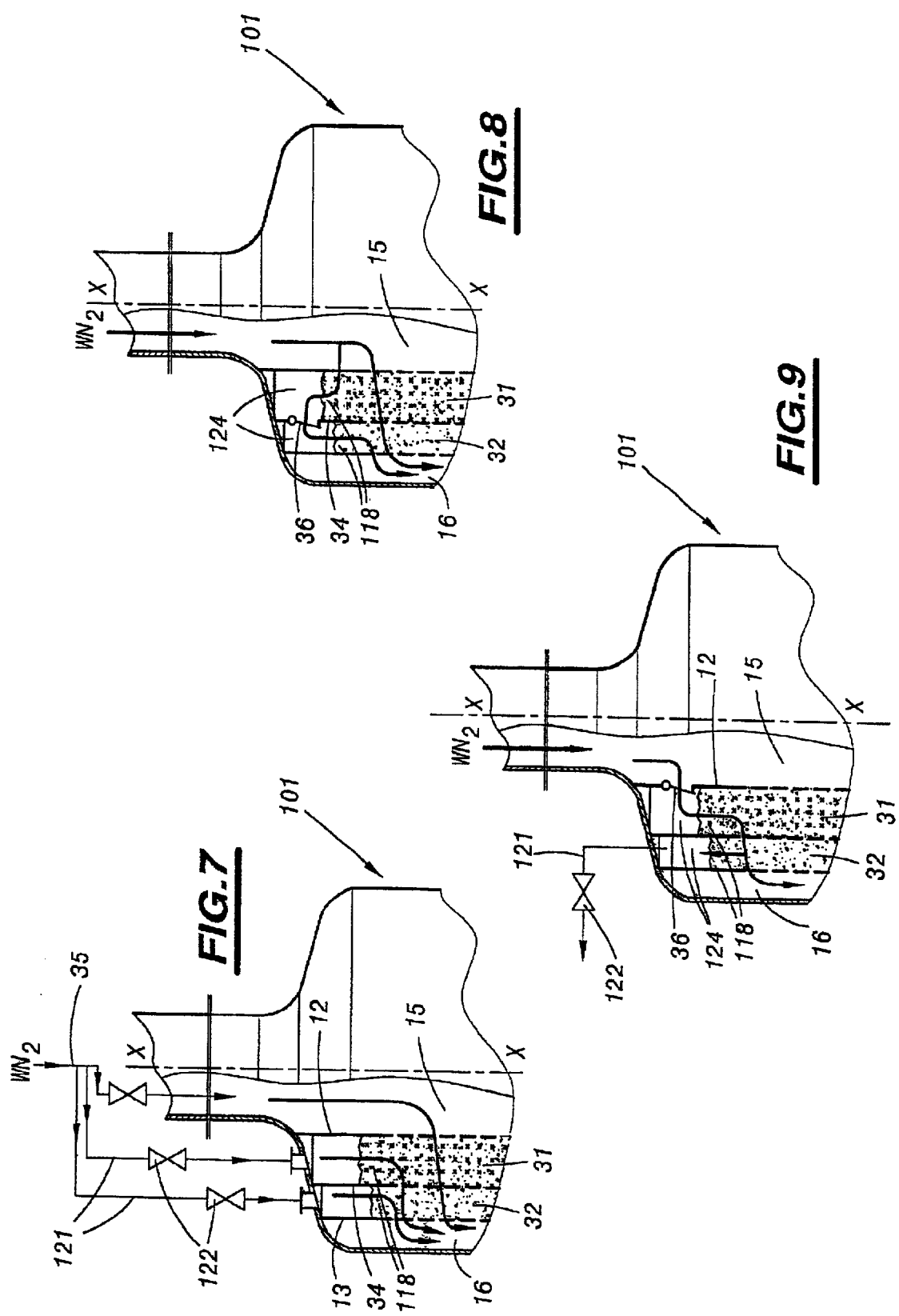

PROCESS AND REACTOR FOR TREATING A GAS BY MEANS OF A REGENERABLE ACTIVE PACKING

CROSS REFERENCE TO RELATED APPLICATION

This application is based on French Patent Application No. 00 03388 filed Mar. 16, 2000, the entirety of which application is hereby expressly incorporated by reference.

FIELD OF THE INVENTION

The present invention relates to a process for treating a gas by means of an active packing, of the type in which a cycle is implemented that comprises at least one treatment phase, in the course of which the gas to be treated is caused to circulate through the packing, and at least one phase for regenerating the packing. Other phases of such a cycle may be the pressurization or depressurization of the active packing.

The invention is applied in particular to processes for treating gaseous mixtures by selective adsorption, such as drying/$CO_2$ removal of atmospheric air intended to be distilled, which may be a TSA process (Temperature Swing Adsorption or modulated temperature adsorption) or a PSA process (Pressure Swing Adsorption or modulated pressure adsorption); or the separation of gaseous mixtures by PSA or VPSA adsorption (Vacuum Pressure Swing Adsorption or vacuum modulated pressure adsorption), for example for producing oxygen from atmospheric air.

The invention especially concerns adsorption processes using at least one annular bed of adsorbent, and reference will be made to this application herein.

In the processes, the bed is contained in a space delimited between two concentric cylindrical grids. The gas to be treated passes through the annular bed and in a generally radial manner in a first direction, whereas a regeneration gas traverses the bed in a generally radial manner in the opposite direction.

To assure that the gas flows effectively traverse the totality of the adsorbent, it is necessary to provide at the top of the bed a device for preventing any by-pass or short-circuit. This may take the form for example of an annular guard of adsorbent, which may be delimited by two solid cylindrical walls connected in a sealed manner to the upper dome of the adsorption receptacle. This guard should be of enough material to remain between the two solid walls after packing of the adsorbent, which is produced after a certain number of cycles of operation owing to periodic dilation/contraction phenomena of the grids, of thermal origin.

Nevertheless, the guard constitutes a space in which the gaseous circulation is not controlled. In this space, certain zones may be poorly regenerated in PSA processes, either because part of the heat of the regeneration gas heats an adjacent wall and does not serve to regenerate the adsorbent, or, more fundamentally, because the heat of regeneration is going to be lost in regions wherein there is an overabundance of adsorbent, or also because the total regeneration flow rate is insufficient to assure a good regeneration.

According to the configuration of the adsorbent bed, other edge effects may be produced, which is to say that other marginal regions of this bed may be formed in a manner unfavorable with respect to flow of at least one of the circulating fluids, which leads to using an excessive mass of adsorbent.

The document U.S. Pat. No. 4,541,851 describes a process of the type described above. In an effort to limit the edge effects and the local by-pass, the document EP-A-0 526 343 proposes to impede the free circulation of the gas in the upper region of the bed by using a flexible sealed membrane. Such a system is also described in the document U.S. Pat. No. 5,759,242.

The document EP A-0 778 082 proposes another solution consisting of one or several deflectors, so as to retard the treated gas during the adsorption phase. However, the deflectors also retard the regeneration gas, such that the problem of the existence of poorly regenerated regions remains.

SUMMARY OF THE INVENTION

The invention has as an object to provide a technique that efficiently and economically combats the edge effects and local by-passes, and to overcome the shortcomings observed for present adsorbers.

To that end, the invention has as an object a treatment process of the type described above, characterized in that, during at least one of the phases of the cycle, the gas outflow is locally increased or decreased in at least one marginal region of the packing.

The invention also has as an object a reactor having regenerable active packing intended to implement the process defined above. This reactor is characterized in that at least one marginal region of the packing is provided with means for establishing at least temporary communication with a point which lies at a different pressure from that of an adjacent region of the packing.

BRIEF DESCRIPTION OF THE DRAWINGS

Examples of implementing the invention will now be described in relation to the accompanying drawings, in which:

FIGS. 7 to 9 are partial views in axial section of three other adsorbers having two annular beds according to the invention.

DETAILED DESCRIPTION OF THE INVENTION

Figure 1:
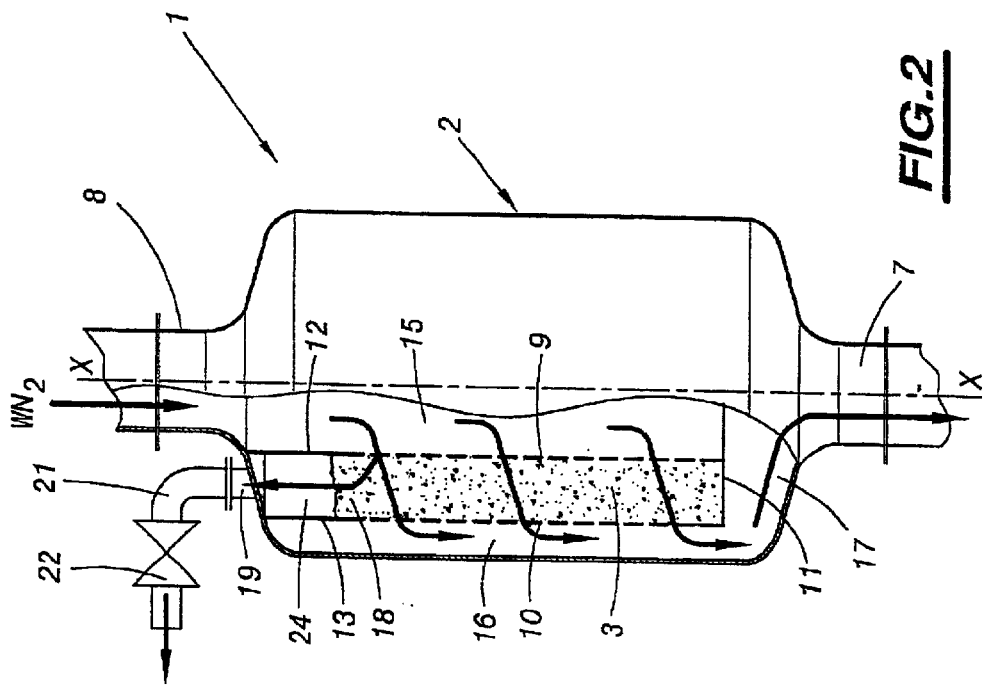
FIG. 1 shows schematically, in axial section, an adsorber having a single annular bed according to the invention, in adsorption phase.
Figure 2:
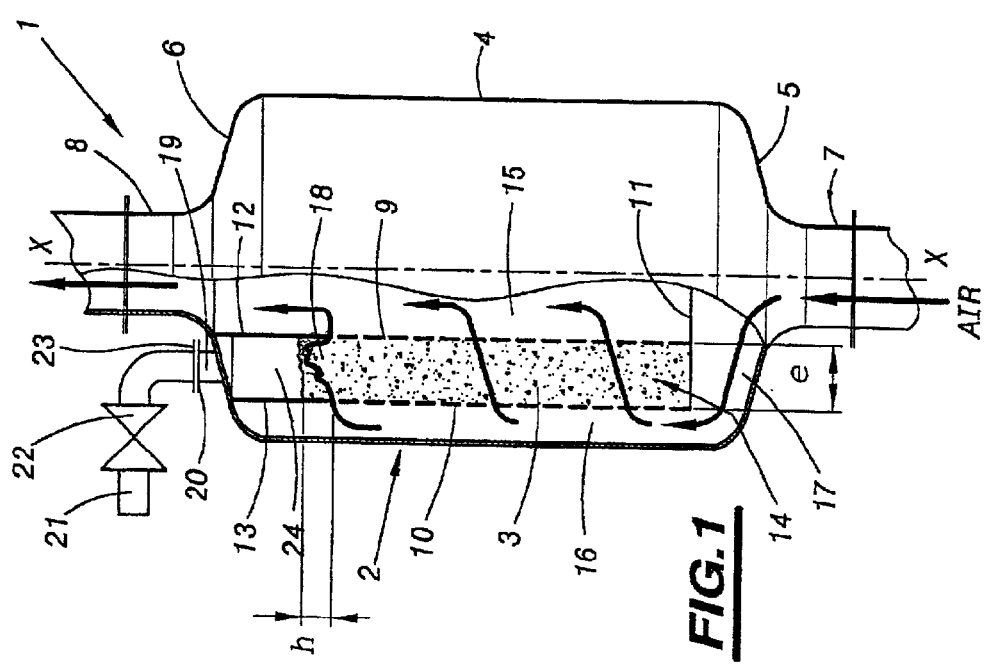
FIG. 2 is a similar view which shows the same adsorber in the stage of flushing by a regeneration gas.

The adsorber 1 shown in FIGS. 1 and 2 is designed for desiccation/$CO_2$ removal by TSA adsorption, of atmospheric air intended to be distilled. It comprises essentially an outer envelope 2 and an annular bed 3 of an appropriate particulate adsorbent, which is for example a molecular sieve. The assembly possesses a general symmetry of revolution about a vertical axis X—X.

The envelope 2 is constituted of a cylindrical sleeve 4, a lower dome 5 and an upper dome 6. A first conduit 7 opens into the dome 5, and a second conduit 8 opens into the dome 6.

Two concentric cylindrical grids, inner 9 and outer 10, are suspended from dome 6. The lower end of the two grids is fixed to a lower base 11 that is circular, planar and horizontal, grid 10 being fixed along the periphery of this base. Each grid is connected to the upper dome 6 via a solid cylindrical sheet metal element 6, respectively 12 and 13. The lower edges of these two sheet metal elements lie at the same level.

The two grids thus delimit:

between them, an intermediate annular space 14 filled by the bed 3;

inside of the grid 9, a central cylindrical space 15 in communication with conduit 8; and between the grid 10 and the envelope, an outer annular space 16 in communication with the space 17 situated beneath the base 11 and, beyond that, with the conduit 7.

The upper level of the bed 3 should always be situated between the two sheet metal elements 12 and 13, even after packing of the bed following cyclic dilation and contraction of the two grids of thermal origin. However, it will be understood that the adsorbent guard 18 situated between these two sheet metal elements should be minimal, so as to limit the quantity of adsorbent. A guard height h of about e/2, wherein e designates the radial thickness of the bed, is considered to be a good compromise.

The dome 6 is provided, opposite the intermediate space 14, with at least one tube 19 for filling this space with adsorbent. This tube terminates in a flange 20 which, in conventional adsorbers, is closed by a cover, as described for example in the above-cited U.S. Pat. No. 4,541,851. Here, that cover is replaced by a section of conduit 21 open to the atmosphere and provided with a valve 22 and a flange 23 for connecting to the flange 20.

In adsorption phase (FIG. 1), the valve 22 is closed. As indicated by the arrows, the air to be purified penetrates into the adsorber via conduit 7, distributes itself into the outer space 16 and passes through the bed 3 in a generally radial and centripetal manner. The purified air collects in the central space 15 and is sent toward the heat exchange circuit of the distillation apparatus (not shown) via conduit 8.

Because of the relation h≅e/2 relative to the adsorbent guard 18, the air has only a slight tendency to penetrate into this guard. A certain quantity of air nevertheless penetrates into the guard and goes out therefrom again, in an uncontrolled manner, as shown by the wavy arrow in FIG. 1.

When the adsorption face is close to the inner grid 9, which is detected by measuring the $CO_2$ content of the purified air exiting the adsorber, this latter is subjected to regeneration, while a second identical adsorber is set in adsorption phase. Regeneration comprises in particular a phase of flushing with a dry and decarbonated regeneration gas, shown in FIG. 2. This gas is impure nitrogen which constitutes the residual gas from the air distillation column (WN2), previously heated.

The bulk of the regeneration gas current enters via conduit 8 into the central space 15, passes through the bed 3 in a generally radial and centrifugal manner, thus arriving into outer space 16 and passing from there into the lower space 17, then into conduit 7, from which it is evacuated into the atmosphere.

Moreover, during this entire flushing phase of the cycle, the valve 22 is open, which places in communication with the atmosphere the annular space 24 overlying guard 18 inside envelope 2.

As a result of the pressure differential thus generated, an ascendant gas outflow is produced through the guard region 18, as shown. It is easy to adjust this outflow to ensure a complete regeneration of the guard 18, such that during the following adsorption phase, no pollution of the purified air is produced in this region.

To obtain this result, said outflow is adjusted such that, in the guard region 18, the ratio of the regeneration gas flow rate to the air flow rate is significantly greater to that which is generally in the bed 3.

In this manner, it is verified that the edge effects are suppressed in the upper region of the bed 3. This is demonstrated by the fact that the "breakthrough" of the adsorption front is effected by the current portion of the bed, in a much cleaner manner than with the conventional process. This permits extending the adsorption time and thus increasing the productivity of the adsorber, that is to say the ratio of the quantity of purified air to the adsorbent mass.

Figure 3:
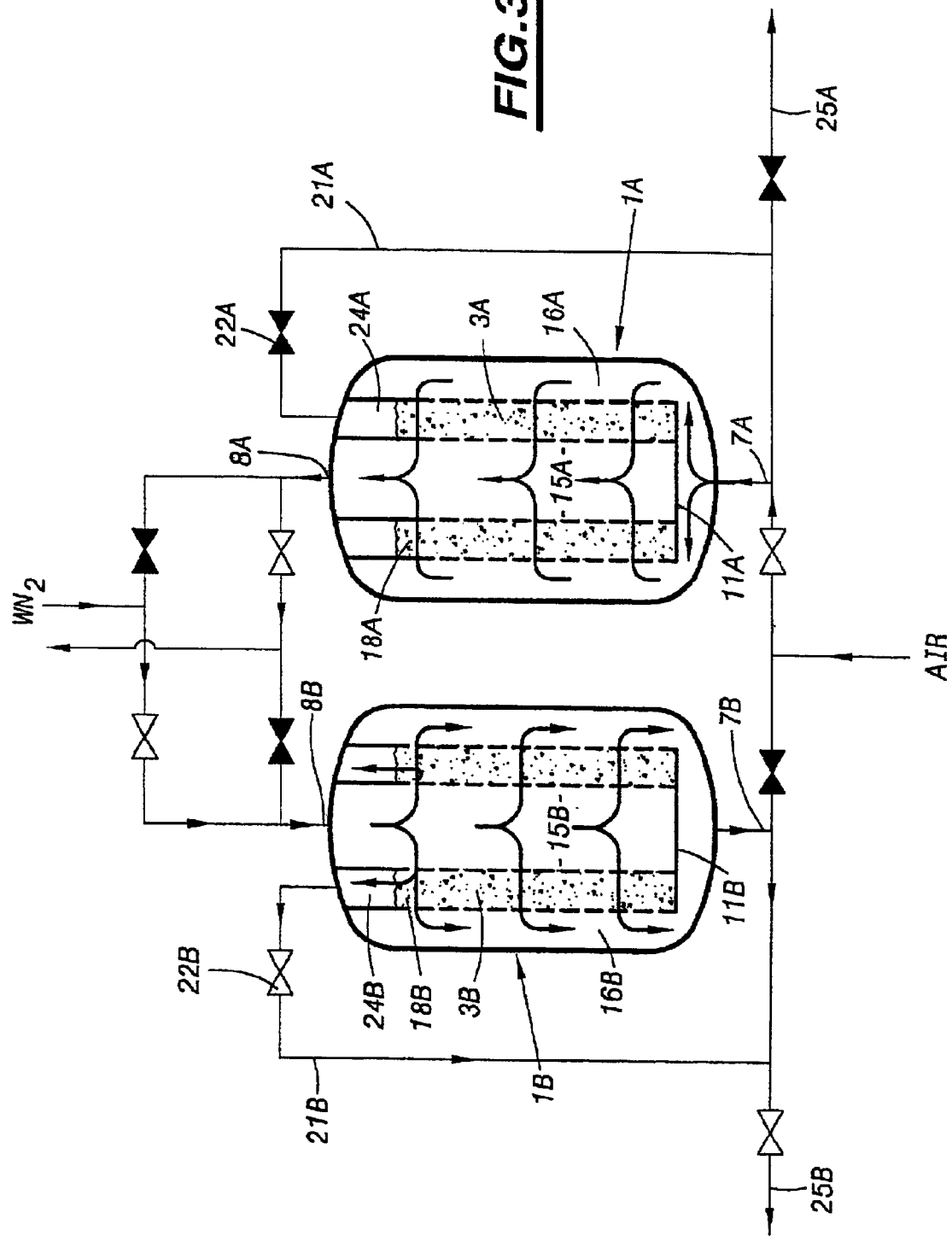
FIG. 3 schematically shows an adsorption apparatus using a variation of the adsorber of FIGS. 1 and 2.

FIG. 3 shows an absorption apparatus comprising two adsorbers 1 in parallel. The adsorber 1A on the right is adsorbing, and the adsorber 1B on the left is in flushing phase. The valves are shown white when they are open and black when they are closed.

The only difference relative to that which was described above with respect to FIGS. 1 and 2 resides in the fact that the conduits 21 are connected not only to the atmosphere but also to respective conduits 25A, 25B for evacuating to the atmosphere the regeneration gas issuing from conduit 7A, 7B.

The resultant advantage is that if, during adsorption phase, valve 22A is opened accidentally, there results merely an admission of impure compressed air into the space 24A, and not a violent escape of compressed air to the atmosphere via valve 22A.

Figure 4:
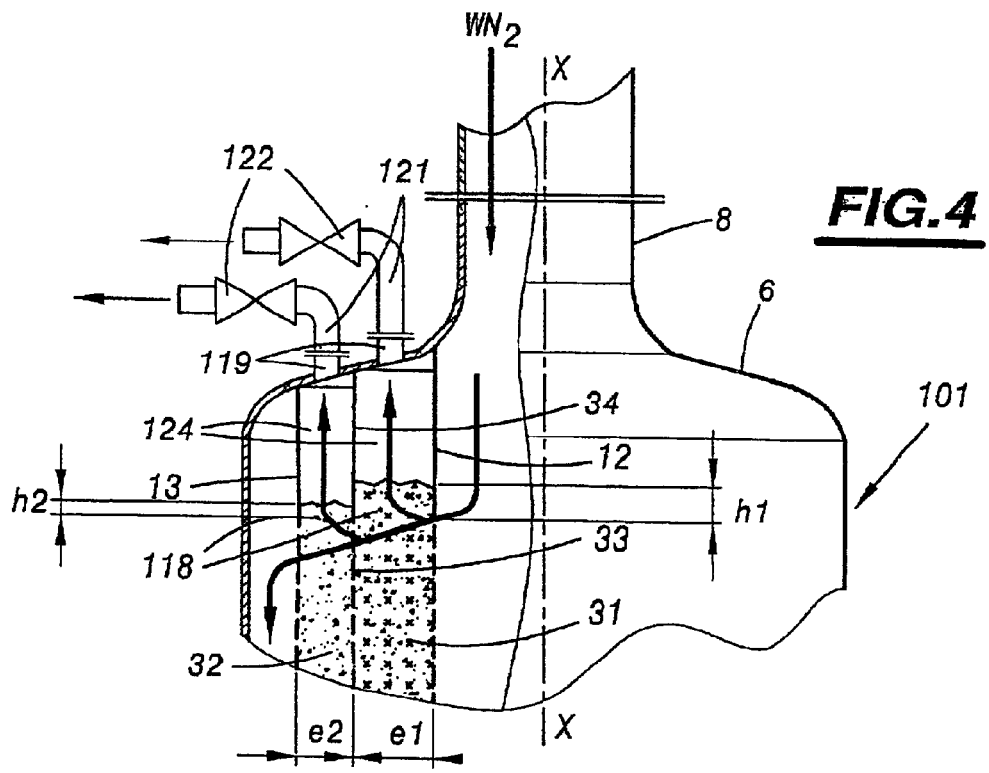
FIG. 4 is a partial view in axial section of an adsorber having two annular beds according to the invention.

The adsorber 101 shown in FIG. 4 is similar to the adsorber 1 of FIGS. 1 and 2, with the exception that the adsorbent bed is subdivided into two concentric and contiguous annular beds, inner 31 and outer 32, separated by an intermediate grid 33. This latter, fixed at its base to platform 11, is suspended to a third imperforate cylindrical sheet metal element 34 connected in an air-tight manner to the upper dome 6. This sheet metal element 34 extends downwardly to the same point as the two other sheet metal elements 12 and 13. The bed 31 is typically a molecular sieve and the bed 32 is silica gel or activated alumina.

The radial thicknesses of the two beds being respectively e1 and e2, the heights of the two barrier regions are preferably chosen h1≅e1/2 and h2≅e2/2, for the same reasons as before.

A filling tube 119 opens into each space 124 overlying an adsorbent guard region 118. As before, this tube is connected to a conduit 121 equipped with a valve 122.

The operation is the same as before: in adsorption phase, valves 122 are closed, whereas they are open during the step of flushing with impure nitrogen, so as to create an additional ascendant outflow of regeneration gas across the two adsorbent guards 118, as indicated by the arrows. The resulting advantages are those described above with respect to FIG. 2.

It will be understood that, one could also connect conduits 121 to the conduit for evacuation of the regeneration gas issuing from the adsorber, in a manner similar to that which was described with respect to FIG. 3.

Figure 5:
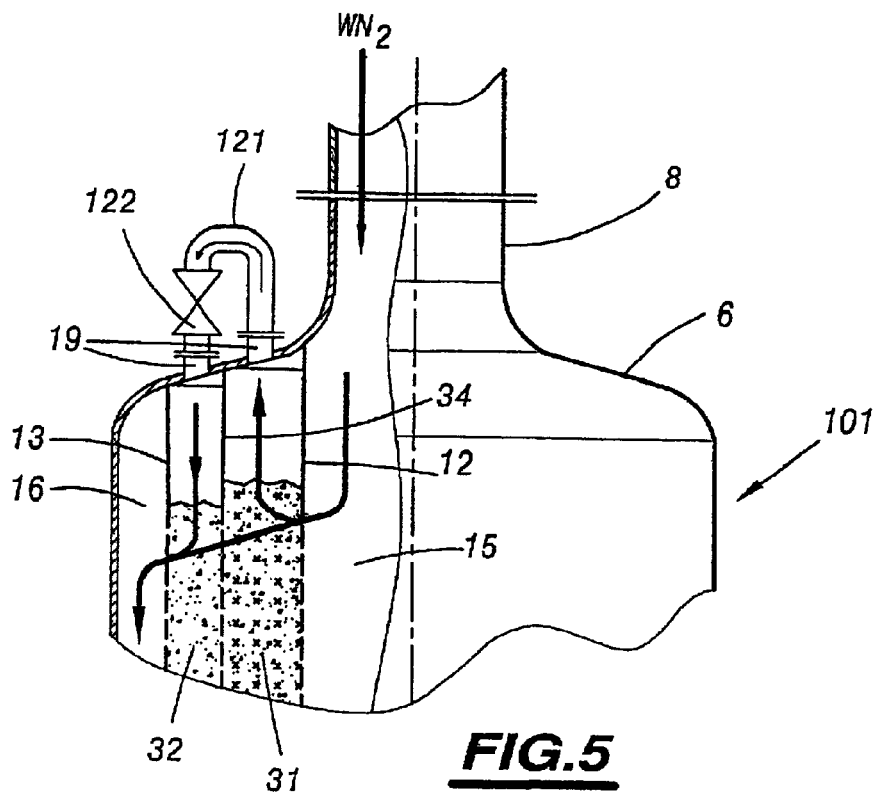
FIG. 5 is a view similar to FIG. 4 of a variation.

In the variation of FIG. 5, the two conduits 121 are replaced by a single conduit 121 in the shape of an inverted U, which connects the two tubes 119 to one another and which is equipped with a single valve 122. In effect, the pressure conditions which prevail during flushing impose, with valve 122 open, an ascendant outflow in the guard region of the bed 31 and a descendant flow in that of the bed 32, as indicated by the arrows.

Figure 6:
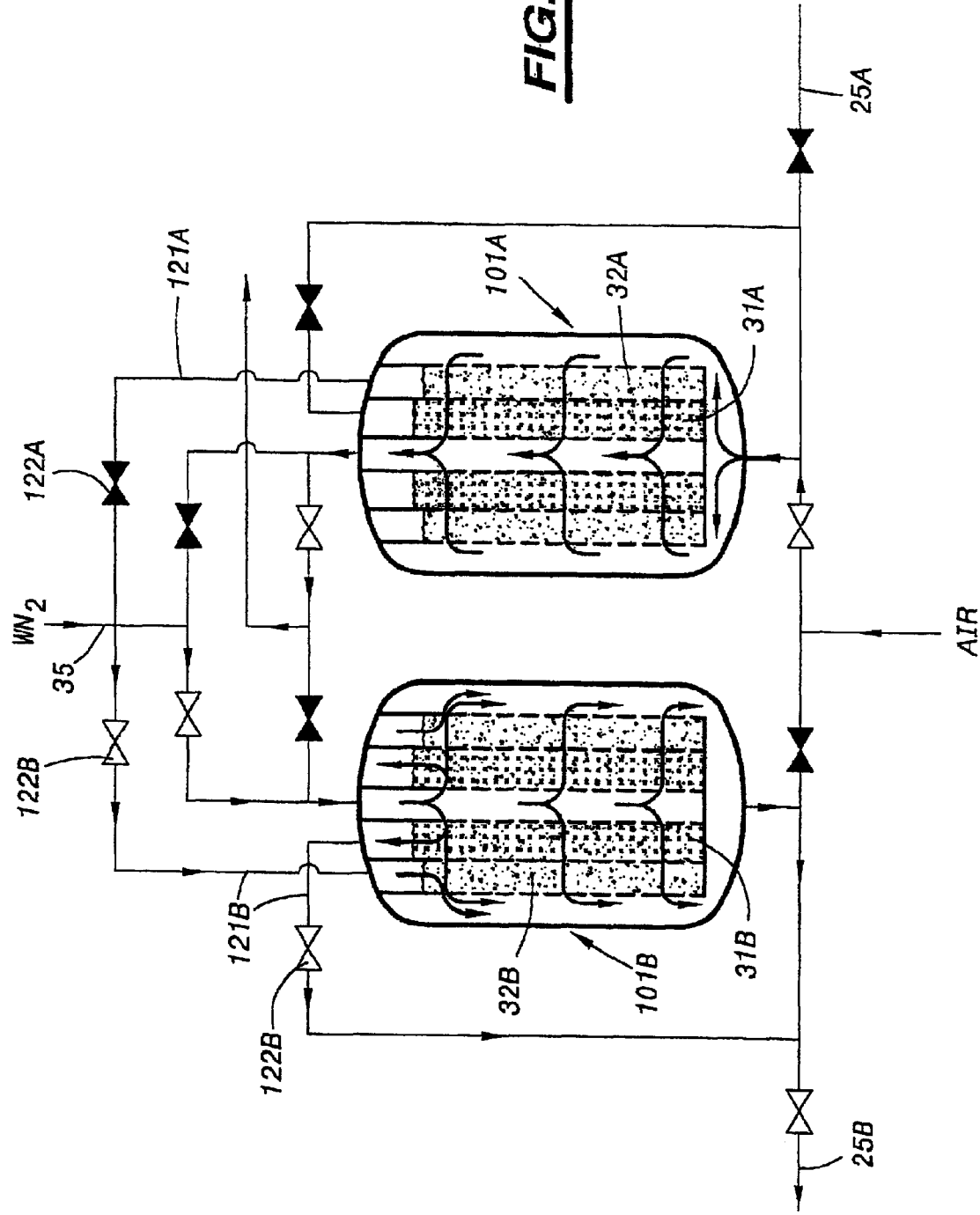
FIG. 6 is a view similar to FIG. 3 of an adsorption apparatus using a variation of the adsorber of FIG. 4.

The same type of regeneration gas outflows through the two adsorbent guards 118 may be obtained with the adsorber 101 of FIG. 4, by connecting the conduit 121 of the bed 32 to the impure nitrogen supply conduit 35. The other conduit 121 may thus be connected to the atmosphere or, as shown in FIG. 6 to the corresponding conduit 25 for evacuation of the generation gas issuing from the adsorber.

Likewise, as a variation (FIG. 7), the two guards 118 of the adsorber 101 may be flushed from top to bottom by a flow of impure nitrogen, by connecting the two conduits 121 to the conduit 35.

FIG. 8 illustrates a variation of FIG. 5 in which the conduit 121 and its valve 122 are replaced by a simple opening of the sheet metal element 34 at the top of which is connected a plate 36 forming an anti-return flap valve.

In adsorption phase, the pressure which prevails above the bed 32 is greater than that which prevails above the bed 31, which keeps the flap valve closed. In flushing phase, on the contrary, it is the pressure that prevails above the bed 31 which is greater, which causes opening of the flap valve.

As illustrated in FIG. 9, the flap valve 36 may also be provided in the inner sheet metal element 12, with the space 124 overlying the bed 32 connected to a point having much lower pressure (atmospheric or conduit 25, or outer space 16 via a second similar flap valve) or much high pressure (conduit 35). The flow is thus descendant in the inner guard and, as the case may be, ascendant or descendant in the outer guard.

In a general manner, it will be understood that an anti-return flap valve may be used in replacement of a valve 22 or 122 when the pressure differences at its boundaries are reversed between the adsorption phase and the phase of flushing with the regeneration gas.

Figure 10:
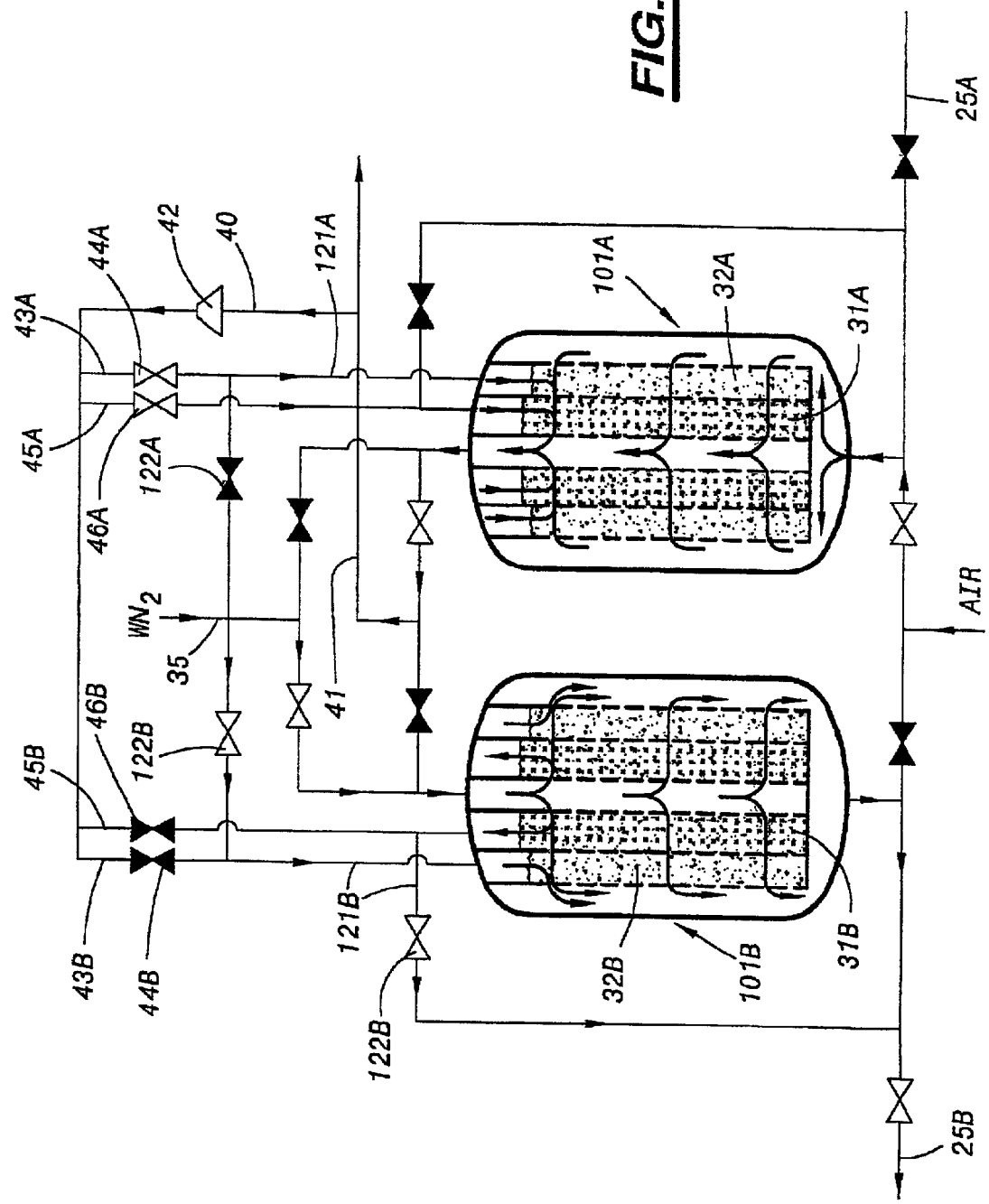
FIGS. 10 to 12 are views similar to FIG. 6 illustrating other variations for implementing the invention.
Figure 11:
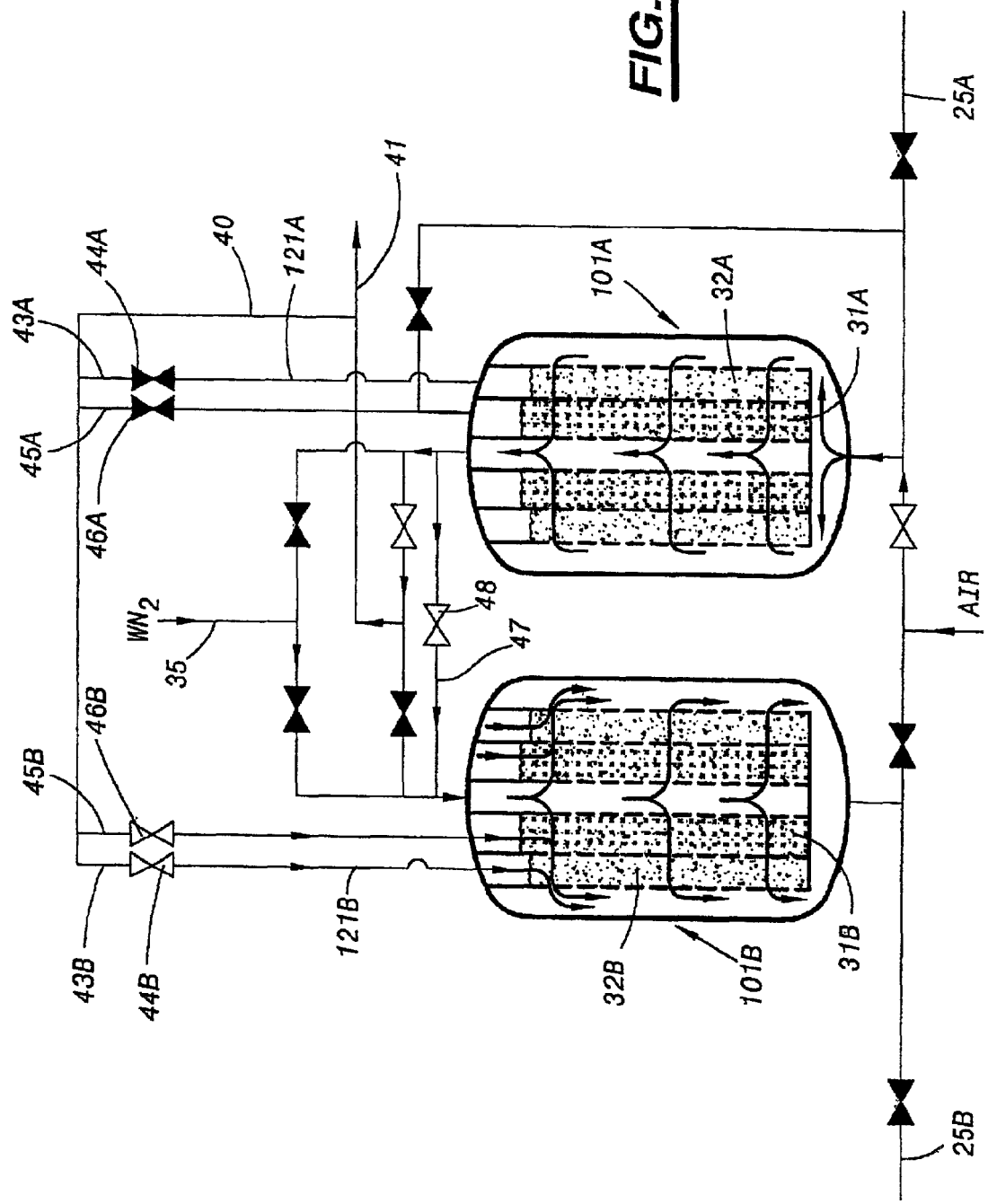
Figure 12:
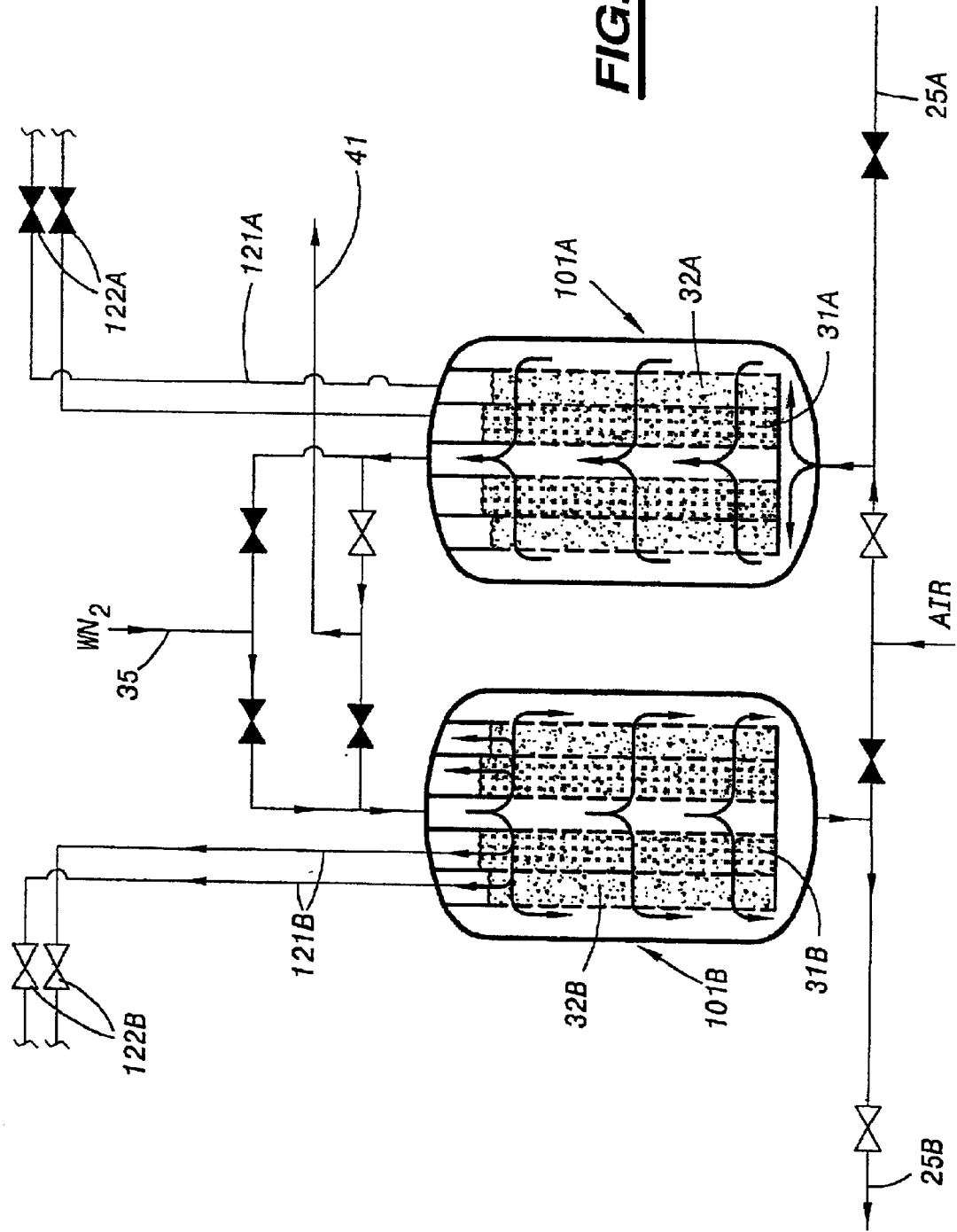

FIGS. 10 to 12 show how the local modification of the gas flow in the adsorbent guard may be implemented in other phases of the adsorption cycle, in the context of two adsorbers 101A, 101B having two concentric beds of FIG. 6.

In the case of FIG. 10, there is added to FIG. 6: a conduit 40 for high pressure air, opening onto conduit 41 for production of purified air, provided with an air compressor 42. The delivery of this compressor is connected by conduits 43, provided with valves 44, to the spaces that overlie the beds 31, and via conduits 45, provided with valves 46, to the spaces that overlie the beds 32.

As shown in FIG. 10, valves 44A and 46A corresponding to the adsorber 101 in adsorption phase are open, whereas valves 44B and 46B corresponding to the adsorber 101B in regeneration phase are closed. Thus, an additional current of purified air passes from top to bottom of the two adsorbent guards of the adsorber in the course of adsorption, as indicated by the arrows, which prevents any stagnation in these guards.

In the variation of FIG. 11, the layout differs from that of FIG. 10 by the deletion of the compressor 42. Moreover, there is indicated in FIG. 11 a pressure equilibration conduit 47, provided with a valve 48, which connects the central spaces of the two adsorbers. This conduit 47 in fact also exists in all of the other embodiments, but is not shown therein for the sake of clarity of the drawings, because the repressurization phase of the adsorbers is not of concern.

Here, on the other hand, we consider the repressurization of the adsorber 101B which has terminated its regeneration. To effect this repressurization, in the conventional manner, the current of impure nitrogen is interrupted, the conduit 25B is closed and the valve 48 is opened. Simultaneously, valves 44B and 46B are opened, such that an additional current of compressed purified air coming from conduit 41 traverses from top to bottom each adsorbent guard region. Again, any stagnation is thereby prevented in these guard regions during the repressurization of the adsorber.

The arrangement of FIG. 12 differs from that of FIG. 6 by the fact that the spaces which overlie the two guard regions of each adsorber are connected to the atmosphere, or to conduits 25, via conduits 121, as in the case of FIG. 4. In the case of FIG. 12, however, the valves 122 are also open, at the same time as the valve of the corresponding conduit 25, during the phase of depressurization of the adsorber (the adsorber 101B in the example shown) which immediately follows the adsorption phase. In this manner, an ascendant gas current is established through the two adsorbent guard regions during the depressurization phase, which prevents any stagnation in these guard regions during this phase.

It will be appreciated that the invention can be readily practiced on existing adsorbers, especially in those embodiments which involve only additional equipment external to the adsorber. It may in particular by used to repair an adsorber provided with other means for counteracting edge effects and by-pass, for example following the deterioration of a flexible membrane such as described in the EP-A-0 526 343 document cited above.

Thus, according to the characteristics of the process of the invention:

the packing comprises at least one bed of active particles, especially of adsorbent;

said bed is annular;

said marginal region is the upper region, forming a guard, of the said bed;

during said phase, said marginal region is placed in communication with a point which lies at a different pressure from that of an adjacent region of the packing;

said point is a point of the surrounding atmosphere;

said phase is a flushing phase of the packing by means of a regeneration gas;

in the course of said phase, the ratio of regeneration gas flow rate to the flow rate of gas to be treated, is caused in said region to be greater than the overall ratio of these two flow rates in the packing;

said point is a point of a conduit for evacuation of the regeneration gas having traversed the packing;

said point is a point of a conduit for supplying regeneration gas;

said phase is a phase for treating the said gas;

said point is the delivery from a compressor opening onto the conduit for production of treated gas;

said phase is a phase for recompression of the packing;

said point is a point of the treated gas production conduit;

said phase is a phase for decompression of the packing;

the packing comprises two concentric annular beds, and said marginal region comprises the upper region, forming a guard, of each annular bed;

the height of each region forming a guard is at most equal to half of the radial thickness of the corresponding bed, and, in the course of said phase, the guard-forming regions of the two beds are placed in communication with one another;

during said phase, the upper region of the radially interior bed is placed in communication with a point which lies at a lower pressure, and an additional auxiliary gas is introduced into the space that overlies the other bed;

during said phase, an auxiliary gas is introduced into each of the spaces overlying a bed;

said treatment is a purification by adsorption of atmospheric air intended to be distilled; and said treatment is a separation of a gaseous mixture, especially a production of oxygen from atmospheric air, by pressure modulated adsorption optionally under vacuum.

Moreover, according to the characteristics of the reactor of the invention defined at the outset:

said means comprise a conduit equipped with a stop valve;

said means comprise a passage equipped with an anti-return flap valve adapted to close during the active phases of operation of the packing and to open during the regeneration phases of this packing;

the packing comprises at least one bed of active particles, especially of adsorbent;

said bed is annular;

said conduit or said passage connects the space situated above the bed to the surrounding atmosphere;

said passage connects the space situated above the bed to a conduit for evacuation of gas from below the reactor;

said conduit or said passage connects the space situated above the bed to a conduit for supply of auxiliary gas;

said passage connects a space situated above the bed to a conduit for supply of auxiliary gas;

said supply conduit is connected to an outlet for gas treated by the reactor;

said supply conduit is equipped with a compressor;

the packing comprises two concentric annular beds, and a passage provided with a valve of an anti-return check valve connects the spaces which overlie the two beds; and the packing comprises two concentric annular beds, and at least one partition that delimits a space overlying a bed is provided with an opening equipped with an anti-return check valve that opens radially outwardly or inwardly.

What is claimed is:

1. Process for treating a gas with an active packing contained in a vessel, which comprises the steps of:

performing a treatment cycle which includes at least one treatment phase, in the course of which a gas to be treated is caused to circulate through the packing, and at least one regeneration phase for regenerating the packing; and during at least one phase of the cycle, locally increasing or decreasing a flow of gas circulating in the vessel in a marginal region of the packing.

2. Process according to claim 1, wherein the packing comprises at least one bed of active adsorbent particles.

3. Process according to claim 2, wherein said bed is annular.

4. Process according to claim 3, wherein said marginal region is an upper region, forming a guard, of said annular bed.

5. Process according to claim 1, wherein during said at least one phase, said marginal region is placed in communication with a point which lies at a pressure different from that of an adjacent region of the packing.

6. Process according to claim 5, wherein said point is a point of the surrounding atmosphere.

7. Process according to claim 1, wherein said at least one phase is the regeneration phase for flushing the packing with regeneration gas.

8. Process according to claim 7, wherein in the course of said at least one phase, the ratio of the flow rate of regeneration gas to the flow rate of gas to be treated is caused in said marginal region to be greater than the overall ratio of these two flow rates in the packing.

9. Process according to claim 8, wherein during said at least one phase, said marginal region is placed in communication with a point which lies at a pressure different from that of an adjacent region of the packing, and said point is a point of a conduit for evacuation of the regeneration gas having passed through the packing.

10. Process according to claim 8, wherein during said at least one phase, said marginal region is placed in communication with a point which lies at a pressure different from that of an adjacent region of the packing, and said point is a point of a supply conduit for the regeneration gas.

11. Process according to claim 1, wherein said at least one phase is the treatment phase.

12. Process according to claim 10, wherein during said at least one phase, said marginal region is placed in communication with a point which lies at a pressure different from that of an adjacent region of the packing, and said point is the delivery of a compressor provided onto a conduit for production of treated gas.

13. Process according to claim 1, wherein said at least one phase is a phase for recompression of the packing.

14. Process according to claims 10, wherein during said at least one phase, said marginal region is placed in communication with a point which lies at a pressure different from that of an adjacent region of the packing, and said point is a point of a conduit for production of treated gas.

15. Process according to claim 1, wherein said at least one phase is a phase for decompression of the packing.

16. Process according to claim 1, wherein the packing comprises two concentric annular beds, and said marginal region comprises an upper region, forming a guard, of each annular bed.

17. Process according to claim 16, wherein the height of each guard-forming region is at most equal to half of the radial thickness of the corresponding bed, and in the course of said at least one phase, the guard-forming regions of the two beds are placed in communication with one another.

18. Process according to claim 16, wherein during said at least one phase, the upper region of the radially inner bed is placed in communication with a point which lies at a lower pressure, and an additional auxiliary gas is introduced into the space overlying the other bed.

19. Process according to claim 16, wherein during said at least one phase, an auxiliary gas is introduced into each of the spaces overlying a bed.

20. Process according to claim 1, wherein the treatment is a purification by adsorption of atmospheric air intended to be distilled.

21. Process according to claim 1, wherein the treatment is a separation of atmospheric air for production of oxygen by pressure modulated adsorption optionally under vacuum.

22. A reactor having an active regenerable packing in a vessel, wherein at least one marginal region of the packing is provided with flow control means operable for placing said marginal region at least temporarily in fluid communication with a zone which lies at a different pressure from that of an adjacent region of the packing.

23. Reactor according to claim 22, wherein said control means comprise a conduit equipped with a stop valve.

24. Reactor according to claim 22, wherein said control means comprise a passage equipped with an anti-return flap valve adapted to close during active operating phases of the packing, and open during regeneration phases of the packing.

25. Reactor according to claim 23, wherein the packing comprises at least one bed of active adsorbent particles.

26. Reactor according to claim 25, wherein said bed is annular.

27. Reactor according to claim 26, wherein said conduit connects the space situated above the bed to the surrounding atmosphere.

28. Reactor according to claim 26, wherein said conduit connects the space situated above the bed to a conduit for evacuation of gas from the bottom of the reactor.

29. Reactor according to claim 26, wherein said conduit connects the space situated above the bed to a supply conduit for supplying auxiliary gas.

30. Reactor according to claim 29, wherein said supply conduit is connected to an outlet of gas treated by the reactor.

31. Reactor according to claim 29, wherein said supply conduit is equipped with a compressor.

32. Reactor according to claim 26, wherein the packing comprises two concentric annular beds, and a passage provided with a valve of an anti-return flap valve connects the spaces which overlie the two beds.

33. Reactor according to claim 26, wherein the packing comprises two concentric annular beds, and at least one partition delimiting a space overlying a bed is provided with an opening equipped with an anti-return flap valve which opens radially outwardly or inwardly.

34. Reactor according to claim 24, wherein said bed is annular, and said passage connects the space situated above the beds the surrounding atmosphere.

35. Reactor according to claim 24, wherein said bed is annular, and said passage connects the space situated above the bed to a conduit for evacuation of gas from the bottom of the reactor.

36. Reactor according to claim 24, wherein said bed is annular, and said passage connects the space situated above the bed to a supply conduit for supplying auxiliary gas.

37. Process for treating a gas in an active packing in a vessel, comprising the steps of:

performing a treatment cycle including at least one treatment phase, during which a gas to be treated is caused to circulate through the packing, and at least one regeneration phase for regenerating the packing; and during at least one of the phases of the treatment cycle, placing at least temporarily at least one marginal region of the packing in the vessel in fluid communication with a point at a pressure different from that of a zone of the packing adjacent said marginal region.

* * * * *